(No Model.)  J. W. BARLOW.  2 Sheets—Sheet 2.
PLANTER.
No. 512,462.  Patented Jan. 9, 1894.
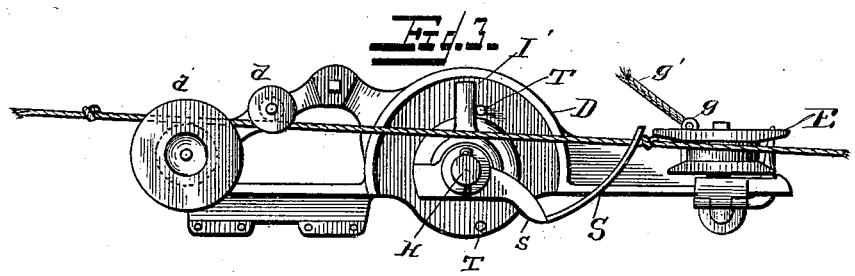
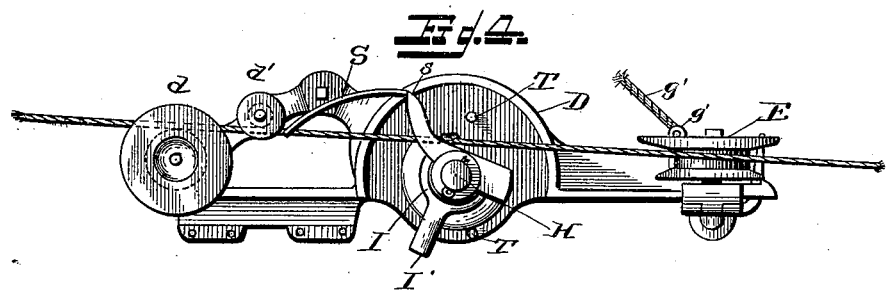
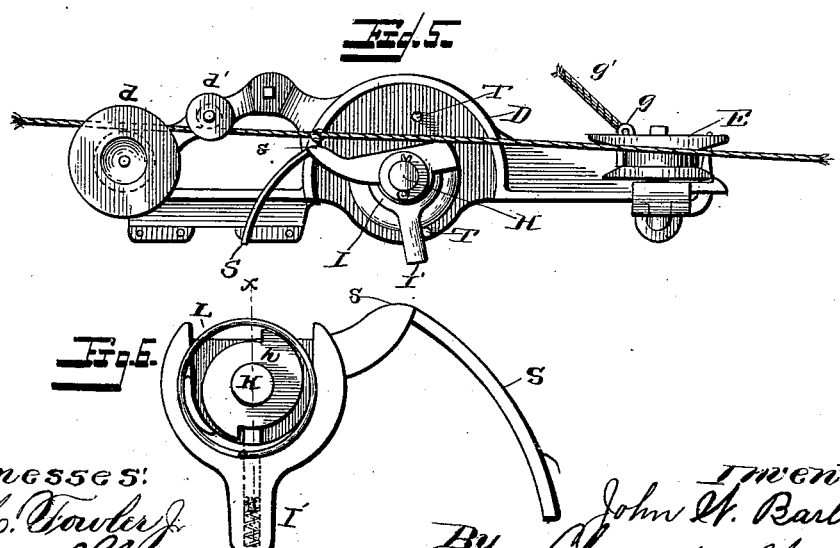
Witnesses:
J. M. Fowler
Alex Stewart
Inventor
John W. Barlow,
By Church & Church
his Attorneys

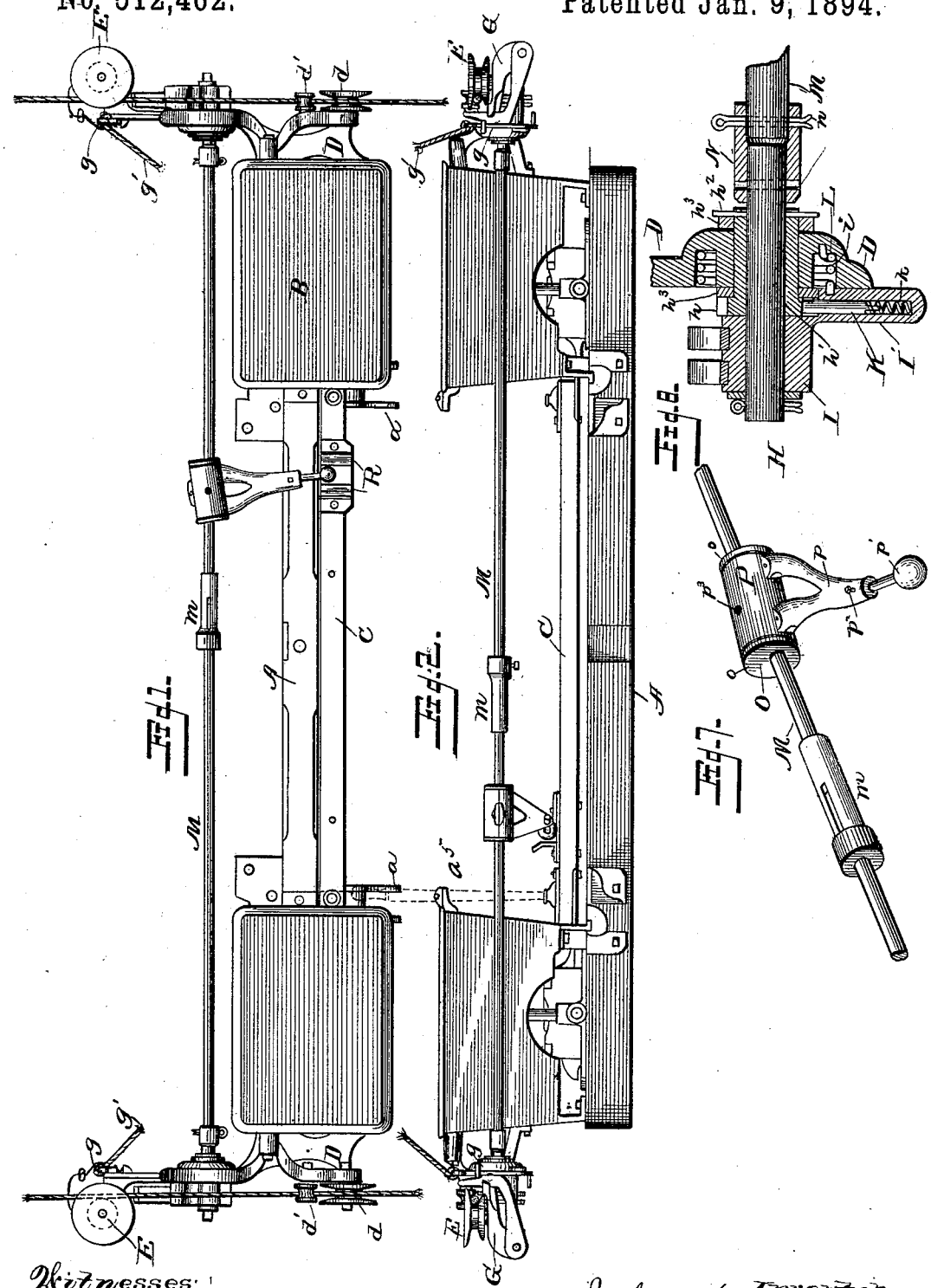

UNITED STATES PATENT OFFICE.

JOHN W. BARLOW, OF QUINCY, ILLINOIS, ASSIGNOR TO THE BARLOW CORN PLANTER COMPANY, OF SAME PLACE.

PLANTER.

SPECIFICATION forming part of Letters Patent No. 512,462, dated January 9, 1894.

Application filed October 17, 1891. Serial No. 408,970. (No model.)

*To all whom it may concern:*

Be it known that I, JOHN W. BARLOW, of Quincy, in the county of Adams and State of Illinois, have invented certain new and useful Improvements in Planters; and I do hereby declare the following to be a full, clear, and exact description of the same, reference being had to the accompanying drawings, forming a part of this specification, and to the letters of reference marked thereon.

This invention relates to improvements in planters, and particularly, to the actuating mechanism for transmitting motion to the shake bar or seeding mechanism and the objects of the invention are to provide a simple mechanism capable of an almost universal application and at the same time one which will operate the shake bar positively in each direction and lock the same, a complete movement in one direction or the other being given by the passage of each knot on the check wire when used in connection with a check row corn planter.

Referring to the accompanying drawings: Figure 1 is a top plan view of the actuating mechanism, seed boxes, shake bar and cross piece of a planter constructed in accordance with my invention. Fig. 2 is a front elevation of the same. Fig. 3 is an end elevation of one of the end frames and parts carried thereby. Figs. 4 and 5 are similar views showing the positions assumed by the actuating arm during the passage of a knot. Fig. 6 is a detail section showing said actuating arm and the clutch. Fig. 7 is a detail of the eccentric. Fig. 8 is a section on line $x$—$x$ of Fig. 6 at right angles to Fig. 6.

Similar letters of reference in the several figures indicate the same parts.

The machines to which the present invention is applicable are well known and hence I have deemed it necessary to show only so much of a check row corn planter as will give a proper understanding of the invention and its manner of application to the machine.

The cross piece lettered A is the piece usually pivotally connected to the wheel frame through connections with the clips $a$, being itself carried upon the runner frame and adapted for the reception of the seed boxes B at each end. The shake bar C passes from one seed box to the other and through suitable pawl and ratchet wheel connections operates the feed plates as the bar is moved in each direction.

On each of the seed boxes are bolted or otherwise secured what I shall herein term the end frames D, in, or upon which are journaled the grooved guide wheels $d$, $d'$ and the drop guide wheel E for the check wire. This last mentioned drop guide wheel or pulley is mounted upon an arm G, pivoted to the end frame and held in normal position by a latch $g$ adapted to be released by the operator through the medium of a cord $g'$ when it is desired to release the check wire on that side.

Referring now particularly to Figs. 3 to 6 and Fig. 8 it will be seen that in each of the frames D is pivotally mounted a shaft H having journaled upon its outer end, a hub I carrying the forked actuating arm through which the check wire is adapted to pass and with which the knots thereon engage to turn the arm as will be presently explained.

Surrounding and constituting the bearings of the shaft H is a sleeve $h$ having its outer end formed into a ratchet wheel, preferably with but two teeth located on diametrically opposite sides and constituting one member of the clutch, the other member of the clutch being formed by the spring pressed pin K sliding in an extension I' of the hub I pressed upward by a spring $k$. The sleeve $h$ is rigidly connected with the shaft H by means of the pin $h^2$ and for convenience washers $h^3$ are located around said sleeve on each side of the frame as shown clearly in Fig. 8.

A coiled spring L is mounted within a recess $i$ in the frame D around the shaft H and one end of said spring is connected with the frame and the opposite end with the hub I for the purpose of returning said hub to normal position after having been operated by the check wire.

The shafts H on opposite sides of the machine are arranged in line with each other and extending between them is a shaft M, preferably having a coupling $m$ thereon to permit of longitudinal adjustment to facilitate its application, as well as to adapt the mechanism to machines of slightly varying width. The ends of the shaft M are united to the shafts H by sleeves N and pins or cotters n, but it will be understood that a single through shaft could be employed and the hubs I and ratchet h mounted directly thereon without departing from the invention, the divided shaft being employed as a matter of convenience only. The intermittingly rotary movement imparted to the shaft M is converted into reciprocatory movement for vibrating the shake bar by means of the eccentric O which is preferably formed by mounting a spool or cylinder diagonally upon the shaft M and an arm or finger journaled on said eccentric and having its outer end confined between the lugs or wings R on the shake bar. (See Figs, 1 and 2.)

The eccentric O is formed or mounted rigidly upon the shaft and the finger before referred to is formed by a box P surrounding the eccentric and held against longitudinal movement by the end flanges o, one side of the box having an extension p in which is adjustably mounted by means of the set screw $p^2$, the adjustable end of the finger, for convenience terminating in a ball $p'$, the entire finger projecting at substantially right angles to the eccentric. Thus when the shaft M is rotated and the finger and its box held against rotation, the end of the finger is given a vibratory movement longitudinally of the shaft, which motion is imparted to the shake bar by the means before described. With this arrangement a half revolution of the shaft M will give the finger a movement from one extreme of its vibration to the opposite extreme and in order to impart this half rotation thereto by the passage of each knot, the forked arm on the hub H is curved from the end to a point some distance below the hub when in normal position, shown in Fig. 3, at S, upon which curved portion the knot is adapted to ride as the fork is turned thereby, until a point approximately near the hub is reached where the fork is turned sharply inward or toward the hub forming an incline s down which the knot rides until the position shown in Fig. 4, is assumed, when the knot reverses its former movement with relation to the arm and rides up the incline s, as shown in Fig. 5, thence out between the pulleys $d'$, $d$ in the ordinary manner allowing the actuating fork to return to normal position under the influence of its spring.

It will be understood that the motions of the knot and arm described are strictly with relation to each other for as a matter of fact, the knot deviates but little, if at all from a straight line between the pulleys but the arm is caused to assume the positions indicated.

It will be noted that the tendency of the arm under the influence of its spring is to raise the check wire, which tendency is overcome by the small guide pulley $d'$ mounted on a horizontal journal and adapted to bear directly upon the upper side of the wire. The movement of the fork and shaft is limited by the stop pins T with which finger $I'$ co-operates as shown clearly in Figs. 3 and 5.

The application of power to the end of the eccentric finger has practically no tendency to move the same. Thus it constitutes a most effectual lock for the shake bar absolutely preventing any rebound or movement of the bar from the position to which it is carried by the finger.

The eccentric it is obvious may be made in any ordinary manner and so far as this part of the invention is concerned it is immaterial from whence the shaft upon which the eccentric is mounted derives its power. Thus the device is applicable to drill planters or in fact to any of the large class of planters now known.

The eccentric finger may be easily and quickly disengaged from the shake bar by lifting it out of the clips R and allowing it to hang pendent from the shaft, when the shake bar may be operated by the usual hand lever $a^5$ as shown in dotted lines, Fig. 2.

The actuating mechanism herein described, is small and effective and at the same time may be easily and quickly applied to machines of almost any style in which a shake bar is used, it being a comparatively simple matter to secure the end frames in place and apply the cross shaft with its eccentric finger as heretofore described.

Having thus described my invention, what I claim as new is—

1. In a planter, such as described, having a seeding mechanism and shake bar for operating the same, the combination with said shake bar and the rotary shaft lying substantially parallel therewith, of an eccentric on said shaft, the finger having the box surrounding the eccentric and the adjustable end secured on the finger and engaging the shake bar; substantially as described.

2. In a planter, such as described, having a seeding mechanism and shake bar for operating the same, the combination with said shake bar and the rotary shaft lying substantially parallel therewith, of the spool having the end flange secured diagonally on said shaft and constituting an eccentric, the finger having the box surrounding the eccentric, the adjustable end on said finger terminating in a ball, the clips on the shake bar with which the ball co-operates and means for rotating the shaft; substantially as described.

3. In a planter, such as described, having a seeding mechanism and shake bar for operating the same, the combination with said shake bar, the rotary shaft lying substantially parallel therewith, the eccentric on said shaft and the finger carried by said eccentric and engaging the shake bar, of the forked lever journaled on the end of the shaft and the clutch connection between the lever and shaft; substantially as described.

4. In a planter, such as described, having a seeding mechanism and shake bar for operating the same, the combination with the shake bar, the rotary shaft lying substantially parallel therewith and connections between said shaft and shake bar, of the forked lever journaled on the end of said shaft and the clutch connecting the lever and shaft; substantially as described.

5. In a planter, such as described, having a seeding mechanism and shake bar for operating the same, the combination with the shake bar, the rotary shaft lying substantially parallel therewith and connections between said shaft and shake bar, of the forked lever bent in the plane of its motion journaled on the end of the shaft and a clutch interposed between the arm and shaft; substantially as described.

6. In a corn planter, such as described, the combination with the actuating shaft, of the forked lever carried thereby having the end curved in the plane of its movement with a relatively sharp turn adjacent the shaft whereby the final forward movement of the arm is imparted thereto as the knot rides over said surface away from the shaft; substantially as described.

7. In a corn planter, such as described, the combination with the horizontal actuating shaft, the end frame and the guide pulleys for the check wire thereon, of the forked arm mounted on the end of said shaft and moving in a vertical plane and a clutch connection between said shaft and arm; substantially as described.

8. In a corn planter, such as described, the combination with the end frames, the short shafts journaled thereon and carrying the forked actuating levers, of the shaft connecting said short shafts and connections between said last mentioned shaft and the shake bar; substantially as described.

9. In a corn planter, such as described, the combination with the end frames, the short shafts journaled therein and carrying the forked actuating levers, of the shaft having the adjustable coupling therein, the sleeves connecting the ends of said shaft and the short shafts in the frame and connections between the connecting shaft and shake bar; substantially as described.

10. In a corn planter, such as described, the combination with the shake bar, end frames having the short horizontal shafts journaled therein and carrying the forked actuating levers, of the shaft connecting said short shafts, the spool mounted diagonally on said shaft and constituting an eccentric, and the finger carried by said eccentric and engaging the shake bar; substantially as described.

11. In a check row actuating mechanism for corn planters, the combination with the end frame carrying the guide pulleys for the check wire and having the bearing therein, of the short horizontal shaft journaled in said bearing, the ratchet wheel rigidly connected to the shaft, the forked lever journaled on the end of the shaft, the pawl on the forked lever engaging the ratchet wheel and the spring for returning the lever to normal position; substantially as described.

12. In a check row actuating mechanism for corn planters the combination with the end frame carrying the guide pulleys for the check wire and having the bearing therein, of the ratchet wheel having the sleeve journaled in said bearing, the short shaft passing through said sleeve and connected rigidly therewith, the forked lever journaled on the end of the shaft, the pawl carried by the lever and engaging the ratchet wheel and the spring for returning the arm to normal position; substantially as described.

13. In a check row actuating mechanism for corn planters the combination with the end frame carrying the guide pulleys for the check wire and having the bearing therein with the annular recess around the same, of the short shaft journaled in said bearing, the ratchet wheel rigidly connected to the shaft, the forked lever journaled on the end of the shaft, the pawl carried thereby engaging the ratchet wheel and the spring lying in said annular recess, having one end connected to the frame and the opposite end connected to the forked lever, whereby the latter is returned to normal position; substantially as described.

JOHN W. BARLOW.

Witnesses:
GEORGE CASTLE,
JOSEPH C. BARLOW, Jr.